Patented Jan. 9, 1945

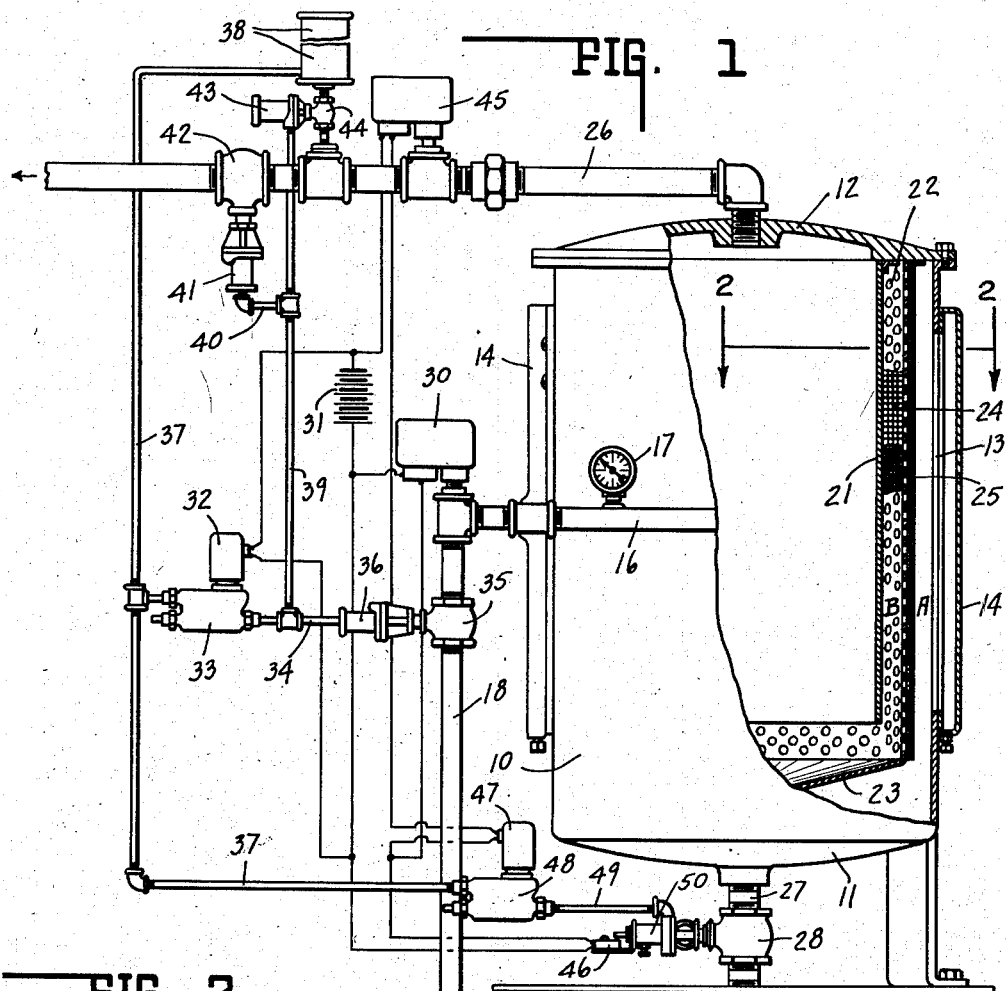
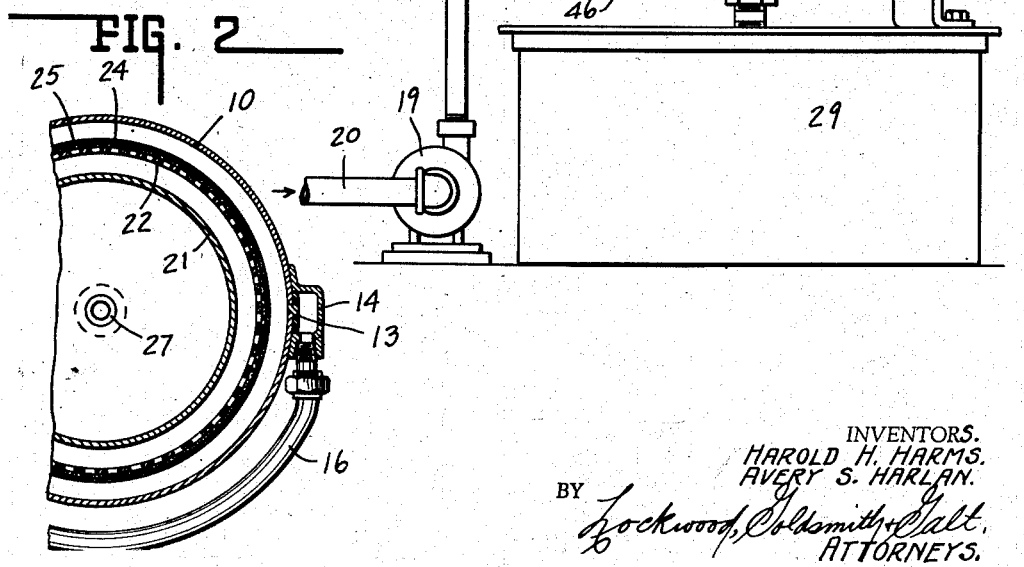

2,366,903

UNITED STATES PATENT OFFICE 2,366,903

APPARATUS FOR CLARIFYING FLUIDS

Harold H. Harms, Bowling Green, Ohio, and Avery S. Harlan, Beach Grove, Ind., assignors to Honan-Crane Corporation, Lebanon, Ind., a corporation Application May 15, 1942, Serial No. 443,106

5 Claims. (Cl. 210—152)

This invention relates to an apparatus for clarifying fluids, such as oil employed in machine shops, where it is desired to remove foreign matter therefrom, such as abrasives, filings and the like, and thereby permit the oil to be again used. The invention is also useful for removing foreign matter from engine oil preliminary to its purification, and for removing matter and clarifying other fluids.

It is the purpose of this invention to provide an apparatus for accomplishing the above purposes which will be automatic in its character in that provision is made for automatically removing accumulated foreign matter from the screens when such foreign matter gathers thereon sufficient to prevent efficient functioning. Thus, it has been found in practice that in passing such oil or fluid through a screen for removing the foreign matter therefrom, the meshes of the screen become clogged by such matter within a short time, thereby rendering the screen ineffective. By means of this invention, upon the screen thus being rendered ineffective it is automatically cleansed and the clarifying operation permitted to continue.

This is accomplished by providing a valve controlled mechanism operable to perform upon an effective pressure being built up by reason of the accumulation of foreign matter upon the screen. The mechanism is arranged to periodically develop a pulsating and reversing pressure, such as to dislodge the clogging material, force it from the screen in the opposite direction, and blow it out of the clarifier, said mechanism being automatically operated to return the clarifier to its normal operation.

Another feature of the invention resides in the provision for further separation and reclamation of such oil as is blown out of the clarifier with the clogging material or sludge. For this purpose the blow down tank for receiving the dislodged material may be provided with a receiving compartment having a screen support for a sludge bag through which oil filters and from which it passes through screens to an outlet compartment from which it may be returned to the system for clarifying and as will be hereinafter more particularly shown and described.

The full nature of the invention will be understood from the accompanying drawing and the following description and claims:

Fig. 1 is a side elevation of the apparatus embodying the invention with portions thereof shown in section. Fig. 2 is a section taken on the line 2—2 of Fig. 1.

In the drawing there is shown a cylindrical clarifier tank 10 provided with a sump forming bottom 11 and an outlet head 12. In the wall of the tank there is provided a pair of oppositely disposed vertical slots 13, which slots terminate short of the top and bottom of the tank, and are directed at an angle to the radius thereof, as shown in Fig. 2. The fluid to be clarified is discharged through said slots 13 in an angular direction to give the fluid a swirling impetus thereabout. Mounted over each of said slots there is provided a header 14 having a drain bottom closed by a drain plug 15. Said headers are connected by the fluid intake line 16 provided with a pressure gauge 17 which is normally connected with an intake pipe 18 connected with a centrifugal pump 19 for forcing the fluid into the tank from a suitable source in communication with a pipe 20.

Within the clarifier tank there is provided an inner downwardly extending cylindrical baffle 21 which is secured to the discharge head 12 and depends downwardly toward the sump with its lower end open and spaced therefrom to permit the fluid to normally pass into the baffle at the bottom end thereof and out through the top. Said cylindrical baffle is surrounded by a perforated sheet metal cylinder which is similarly secured to the outlet head 12 depending therefrom about and in spaced relation to said baffle. The lower end of the perforated cylinder is closed by a downwardly dished imperforate sheet metal bottom plate 23 which is spaced upwardly from the sump 11. The perforated cylinder 22 is provided primarily to support the screening material to prevent collapse thereof under pressure.

Snugly fitting about and secured exteriorly of said perforated cylinder there is a heavy mesh screen 24, and supported exteriorly about said heavy mesh screen there is a fine wire screening or cloth 25. The head 12 is provided with an opening communicating with the discharge pipe 26, and the sump 11 is in communication with a discharge pipe 27 leading through a control valve 28 into a blow down tank for receiving sludge containing the foreign matter, indicated at 29.

In the normal clarifying operation the valve 28 is closed and the pump 19 forces the fluid to be clarified into the headers 14 and through the angularly directed slots 13 into opposite sides of the tank with something of a swirling motion. The fluid is thus directed into the chamber A of the tank outside of the screen, through which it is forced under limited pressure into the screened chamber B. The impurities or foreign matter carried by the fluid is deposited exteriorly of the screen, while the fluid removed therefrom passes through the screen into the chamber B to the bottom thereof and upwardly through the cylindrical baffle 21 and out of the top through the head 12 and discharge pipe 26 to be again used or put through a purifier.

Since accumulation of such foreign matter on the exterior of the fine mesh screen or cloth will soon clog the minute openings therein and prevent the further passage of fluid therethrough, the following automatic operation is provided to remove such material and again free the screen to permit the foregoing operation. For this purpose there is provided a pressure switch 30 in communication with the intake pipe 16, which may be set at a predetermined high pressure, for example, ten pounds, which pressure may be indicated on the pressure gauge 17.

The switch 30 is connected in series with a source of current 31, a normally closed Micro Switch 46, and a solenoid indicated at 32 for actuating a three-way master air valve 33. Said valve 33 is connected by an air pipe 34 to a normally open air operated valve 35 so arranged that it will be closed by an air cylinder 36 upon air being admitted to the pipe 34. Said valve 35 is positioned in the intake line 18 for controlling the passage of the fluid from the pump 19 to the tank. Air is passed through the valve 33 when opened from an air line 37 in communication with a compressed air tank or compressor indicated at 38. Pipe 34 communicates with a pipe 39 which is provided with a branch 40 in communication with an air cylinder 41. Said cylinder 41 operates to close the normally open valve 42 positioned in the outlet pipe 26. Said air pipe 39 is also in communication with an air cylinder 43 which operates to open a normally closed valve 44. Said valve 44 controls the passage of air under pressure from the tank or compressor 38 to the outlet pipe 26 on the tank side of the valve 42.

Upon the screen becoming substantially impervious to the passage of oil therethrough in the clarifying operation, pressure will be built up in the chamber A and the inlet pipes leading thereto from the pump. When a predetermined pressure is thus created, it means that the clarifier will no longer operate efficiently until the screen is cleansed by removal of the accumulated foreign matter. Assuming that the predetermined pressure is ten pounds to the square inch, the switch 30 will be closed to energize solenoid 32 which in turn will actuate valve 33 to admit air under pressure into the valve actuating lines. Thereupon valve 35 will be closed to prevent the fluid from being fed into the tank, valve 42 will be closed, and valve 44 will be opened to permit air under pressure from the tank 38 to flow into the top of the clarifier tank.

When the pressure of the air entering the top of the tank exceeds the predetermined pressure effected by the fluid contained therein to a predetermined differential, such as two pounds, a pressure switch 45 connected with the pipe 26 will be closed at a predetermined pressure, such as twelve pounds per square inch. This switch is in series with the source of current 31, the normally closed switch 46, and a solenoid 47. Thus, the solenoid 47 is thereupon energized and is operably connected with a solenoid actuated valve 48 to open said valve. Said valve is in communication with the compressed air line 37 from which air is admitted to a pipe 49 leading to a valve operating air cylinder 50 connected with the normally closed valve 28 to thereby open the same.

By reason of the differential pressure exerted outwardly through the screen, said pressure will become effective upon opening of the valve 28 to cause the fluid to pass through the screen in the opposite from normal direction and thereby force the foreign matter accumulated upon the screen in the opposite direction, dislodging and carrying the same from the screen in the reverse travel or current of the fluid passing from chamber B to chamber A and downwardly through valve 28 into the blow down tank 29.

The switch 46 is so adjusted that after a predetermined length of time following the passage of current therethrough, and during which the reverse flow of fluid is operating to cleanse the screen, it functions to open and thereby break the circuit through the solenoids 32 and 47 to de-energize the same and cause or permit valves 33 and 48 to close. This action shuts off the pressure upon the controlling cylinders of said valves causing them to thereby be returned to their original and normally closed position. For a predetermined but short period of time, the switch 46 will continue to remain open to permit the flow of fluid to return to the impetus of its normal direction before permitting another period of reverse flow.

This has the effect of periodically reversing the flow of fluid back and forth through the screen to create a pulsating effect to better dislodge the foreign matter therefrom as long as there is sufficient foreign matter to maintain the pressure in chamber A at ten pounds or above, or as long as the switch 46 remains open. But upon the closing of the switch 46 after a predetermined time operation, if the screen has thereupon been sufficiently cleansed to permit fluid to pass from chamber A to chamber B without building up ten pounds pressure, the clarifier will revert to its normal operation until a clogging condition is again created. When again clogged, the same cycle of cleansing operation will take place controlled by the two pressure switches and the switch 46, as above described, to create the intermittent pulsating reverse flow of fluid through the screen.

The invention claimed is:

1. An apparatus for clarifying a fluid including a tank having a normally open valve for controlling an inlet pipe thereto and a normally open valve for controlling an outlet pipe therefrom, a fixed filter screen mounted in said tank between said pipes, a pump for normally delivering fluid through the inlet pipe into said tank under pressure to force the fluid through said screen and outlet pipe to remove foreign matter therefrom, a source of air pressure connected with said outlet pipe between said tank and outlet control valve, a normally closed valve interposed between said source of air pressure and outlet pipe, a normally closed valve for controlling a discharge pipe communicating with said tank on the inlet side of said screen for discharge of foreign matter therefrom, a pressure controlled switch connected to and operated by pressure developed in said tank on the inlet side of said screen, an electric circuit controlled by said switch, and an electrically actuated master valve connected in said circuit operable by said pressure controlled switch to close said normally open valves and open said normally closed valves upon a predetermined pressure being built up on the outlet side of said screen due to clogging thereof by foreign matter and thereby permit air to be discharged under pressure from said source through said screen from the outlet to the inlet side thereof to remove said foreign matter and discharge it through said discharge pipe.

2. An apparatus for clarifying a fluid including a tank having a normally open valve for controlling an inlet pipe thereto and a normally open valve for controlling an outlet pipe therefrom, a fixed filter screen mounted in said tank between said pipes, a pump for normally delivering fluid through the inlet pipe into said tank under pressure to force the fluid through said screen and outlet pipe for removing foreign matter from said fluid, a source of air pressure connected with said outlet pipe between said tank and outlet control valve, a normally closed valve interposed between said source of air pressure and outlet pipe, a normally closed valve for controlling a discharge pipe communicating with said tank on the inlet side of said screen for discharge of foreign matter therefrom, an electrically actuated master valve in said circuit operably connected with each of said aforementioned valves, and a periodically operated switch for controlling said circuit to actuate said master valve for causing said master valve to close said normally open valves and open said normally closed valves after a predetermined filtering operation to discontinue said operation and effect a reversal of fluid flow through said screen by discharge of air from said source through said screen and the discharge outlet to remove accumulated foreign matter therefrom.

3. An apparatus for clarifying a fluid, including a tank having a normally open valve for controlling an inlet pipe thereto and a normally open valve for controlling an outlet pipe therefrom, a fixed filter screen mounted in said tank between said pipes, a pump for normally delivering fluid through the inlet pipe into said tank under pressure to force the fluid through said screen and outlet pipe for removing foreign matter from said fluid, a source of air pressure connected with said outlet pipe between said tank and outlet control valve, a normally closed valve interposed between said source of air pressure and outlet pipe, a normally closed valve for controlling a discharge pipe communicating with said tank on the inlet side of said screen for discharge of foreign matter therefrom, and a master control mechanism operably connected with each of said valves operable to electrically close said normally open valves and open said normally closed valves and permit their return to normal position to cause alternate delivery of fluid through said screen from the inlet to the outlet side thereof for filtering said fluid and discharge air from said source in the opposite direction from said screen from the outlet to the inlet side thereof to cleanse said screen and discharge the foreign matter accumulated thereon through said discharge pipe.

4. An apparatus for clarifying a fluid, including a tank having a normally open valve for controlling an inlet pipe thereto and a normally open valve for controlling an outlet pipe therefrom, a fixed filter screen mounted in said tank between said pipes, a pump for normally delivering fluid through the inlet pipe into said tank under pressure to force the fluid through said screen and outlet pipe for removing foreign matter from said fluid, a source of air pressure connected with said outlet pipe between said tank and outlet control valve, a normally closed valve interposed between said source of air pressure and outlet pipe, a normally closed valve for controlling a discharge pipe communicating with said tank on the inlet side of said screen for discharge of foreign matter therefrom, an electrically actuated master valve operably connected with said aforementioned valves, an electric circuit therefor, and a control switch for said circuit operable to alternately actuate said master valve to close said normally open valves and open said normally closed valves to reverse the flow of fluid through said screen for cleansing and removal of foreign matter accumulated thereon for discharge through said discharge pipe.

5. An apparatus for clarifying a fluid, including a tank having an inlet pipe and an outlet pipe, a fixed filter screen thereon between said pipes, means for forcing fluid under pressure through said pipes, tank and screen from the intake side to the outlet side thereof, a source of air pressure connected with said tank on the discharge side of said screen, a discharge pipe connected with the bottom of said tank on the intake side of said screen, valves for controlling said pipes and source of air pressure, and mechanism connected with said tank and actuated upon a predetermined pressure being built up in said tank on the inlet side of said screen by clogging thereof, said mechanism being operably connected to said valves for actuating them to discontinue the flow of fluid from the intake to the outlet side of said screen and discharge air from said source of air pressure from the outlet to the intake side of said screen through said tank and discharge pipe.

HAROLD H. HARMS.
AVERY S. HARLAN.